US012683862B1

(12) United States Patent
Jamison et al.

(10) Patent No.: US 12,683,862 B1
(45) Date of Patent: Jul. 14, 2026

(54) CLIENT MANIFEST

(71) Applicant: Workday, Inc., Pleasanton, CA (US)

(72) Inventors: Johnathon Jamison, Fremont, CA
(US); Phuoc Huynh, Sacramento, CA
(US); Justin Sievenpiper, Folsom, CA
(US); Travis Westbrook, Woodinville,
WA (US); Zach Sperske, Los Angeles,
CA (US)

(73) Assignee: Workday, Inc., Pleasanton, CA (US)

( * ) Notice: Subject to any disclaimer, the term of this
patent is extended or adjusted under 35
U.S.C. 154(b) by 0 days.

(21) Appl. No.: 17/941,948

(22) Filed: Sep. 9, 2022

(51) Int. Cl.
 *H04L 29/06* (2006.01)
 *G06F 9/445* (2018.01)
 *H04L 29/08* (2006.01)
 *H04L 41/0853* (2022.01)

(52) U.S. Cl.
 CPC ................................ *H04L 41/0853* (2013.01)

(58) Field of Classification Search
 CPC . H04L 41/045; H04L 41/0853; H04L 67/306;
 H04L 67/34; G06F 9/445; G06F 11/36
 USPC .......................................... 709/224
 See application file for complete search history.

(56) References Cited

U.S. PATENT DOCUMENTS

| | | | | |
|---|---|---|---|---|
| 7,370,275 B2 * | 5/2008 | Haluptzok | .............. | G06F 9/451 |
| | | | | 704/4 |
| 8,234,350 B1 * | 7/2012 | Gu | ..................... | H04N 21/2668 |
| | | | | 725/86 |

| | | | | |
|---|---|---|---|---|
| 8,407,692 B2 * | 3/2013 | Lin | .......................... | G06F 11/08 |
| | | | | 717/174 |
| 8,463,849 B2 * | 6/2013 | Keum | ................... | H04L 65/764 |
| | | | | 709/216 |
| 8,706,856 B2 * | 4/2014 | Mengle | ................. | G06F 9/5055 |
| | | | | 709/224 |
| 9,424,018 B2 * | 8/2016 | Wong | ......................... | G06F 8/61 |
| 9,509,742 B2 * | 11/2016 | Gordon | ................. | H04L 65/612 |
| 9,792,108 B2 * | 10/2017 | Moore | ................. | H04L 41/082 |
| 9,843,617 B2 * | 12/2017 | Maturana | ............... | G05B 19/18 |
| 10,042,717 B2 * | 8/2018 | Bakshan | ............. | G06F 11/1461 |
| 11,005,906 B2 * | 5/2021 | Thomas | ................. | H04L 65/762 |
| 11,025,970 B2 * | 6/2021 | Paixao | ................. | H04L 63/0227 |
| 11,202,122 B1 * | 12/2021 | Sehgal | ............. | H04N 21/44004 |
| 11,593,441 B2 * | 2/2023 | Choi | ..................... | G06F 16/9027 |
| 2006/0161563 A1 * | 7/2006 | Besbris | ................... | G06F 9/545 |
| 2008/0281965 A1 * | 11/2008 | Zhong | ................... | H04L 67/303 |
| | | | | 709/224 |
| 2012/0159424 A1 * | 6/2012 | Shukla | ...................... | G06F 8/34 |
| | | | | 717/103 |
| 2012/0250598 A1 * | 10/2012 | Lonnfors | .......... | H04W 52/0209 |
| | | | | 370/311 |

(Continued)

FOREIGN PATENT DOCUMENTS

WO  WO-2017097978 A1 *  6/2017  ............. H04L 65/65

*Primary Examiner* — Umar Cheema
*Assistant Examiner* — Golam Mahmud
(74) *Attorney, Agent, or Firm* — Cooper Legal Group,
LLC

(57) ABSTRACT

A client manifest identifier is received from a client device.
One or more features to include in a response to the client
device are determined based on a client manifest corre-
sponding to the client manifest identifier. A feature of the
one or more features is associated with a capability indicated
by the client manifest. The response is provided to the client
device. The response has a particular structure based on the
one or more features.

20 Claims, 9 Drawing Sheets

(56)     References Cited

U.S. PATENT DOCUMENTS

| 2014/0181193 A1* | 6/2014 | Narasimhan | .......... | H04L 67/306 |
| | | | | 709/204 |
| 2015/0120821 A1* | 4/2015 | Bendell | ................. | G06F 16/957 |
| | | | | 709/203 |
| 2015/0193399 A1* | 7/2015 | Woker | .................. | H04L 41/082 |
| | | | | 715/234 |
| 2015/0199278 A1* | 7/2015 | Fioravanti | .......... | G06F 12/0891 |
| | | | | 711/135 |
| 2015/0212991 A1* | 7/2015 | Barraclough | .......... | G06F 21/62 |
| | | | | 715/204 |
| 2018/0343482 A1* | 11/2018 | Loheide | ............. | H04N 21/2387 |
| 2018/0367592 A1* | 12/2018 | Thomas | ............... | H04L 65/612 |
| 2019/0342356 A1* | 11/2019 | Thomas | ............ | H04N 21/8458 |

* cited by examiner

| | | |
|---|---|---|
| 102 Client | 104 Client | 106 Client |

112    114    116

Server — 122

| 124 Client Manifest Analyzer | 126 Manifest Store |
|---|---|

130

140

142 — Server Developer      Client Developer — 132

200

Receive A Client Manifest Identifier — 202

Determine One Or More Features To Include In A Response To The Client Device Based On A Client Manifest Corresponding To The Client Manifest Identifier — 204

Provide A Response Having A Particular Structure Based On The One Or More Features — 206

300

CLIENT MANIFEST

BACKGROUND OF THE INVENTION

A server is coupled to a plurality of client device categories. The server maintains a single version of its own code to service all the clients. Each client device category and version is associated with its own set of capabilities. The server code may be updated to deploy one or more new features. Some of the clients may experience one or more errors when the server code is updated because they are not capable of supporting the one or more new features.

BRIEF DESCRIPTION OF THE DRAWINGS

Various embodiments of the invention are disclosed in the following detailed description and the accompanying drawings.

DETAILED DESCRIPTION

Figure 1:
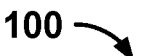
FIG. 1 is a block diagram illustrating an embodiment of a system for implementing a client manifest.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to prevent a client device from experiencing one or more errors when the code associated with a server is updated is disclosed. Code is deployed containing a hard-coded client manifest identifier specific to the client that the code is written for and specific to the version of that code. When a user receives this code on their device (by installing an application or navigating via a web browser), this manifest identifier is sent by the code over the network when communicating with the server. The server retrieves the client manifest associated with this manifest identifier from a manifest store (e.g., an independent store). The client manifest describes the one or more capabilities associated with the client. For example, the client manifest may describe a data type that the client is capable of handling (e.g., a new addition to the client/server data protocol). The client manifest can also hold a list of features that the client can support at arbitrary levels of granularity-such as a whole page, an element of a page, or an adaptation of the protocol. Additionally, the client manifest can include information that enables the server to know in advance if a specific user interface (UI) widget is supported by the client. In cases where the client does not support the data type, feature, or UI widget, the server can then run a fallback to supply the same or similar functionality in a default form, depending on the case at hand. In some embodiments, the client manifest is stored in a manifest store that is separate from the client and server. In some embodiments, the client manifest is stored in a manifest store that is in storage of the server. The manifest store is configured to store client manifests for all client types associated with a given server (e.g., web server, database server, user interface (UI) server, email server, file server, etc.).

The client manifest is a mechanism that allows the client developer to specify what the client can support and allows the server to generate its response based on the client manifest. Rather than the server guessing what a client expects based solely on the client version or creating a whole new API for a small change to the server code, the client can inform the server exactly which features it supports by sending its client manifest identifier when the client makes its requests.

In some embodiments, a server developer can add one or more new features (e.g., a new set of instructions) on their own timeline and tie the one or more features behind one or more corresponding capabilities. The server developers would communicate internally with client developers when the new feature is available. A client developer can uptake the new feature on their own timeline and simply update their client manifest in the store to include the new capability to start receiving the new feature. This is a departure from existing versioning philosophies, that is, the API remains the same, but the client's inputs give the server specific instructions as to what the client can receive in the response. Existing versioning philosophies may require a new API each time if the new feature is not backward compatible with one of the capabilities associated with the client device.

As a result, the server is no longer bloated with almost identical APIs. Nor does it have to include if/else statements based solely on the version of the client. In addition, it eliminates the need to sync deployment of client and server feature flags to enable features, or even use feature flags in the server at all. Instead, the same API is used and a feature corresponding to a well-defined capability is either included or excluded based on what the client manifest associated with the client indicates the client can handle. The server work can be completed and in place, ready for clients to start using on their own schedules when they are ready for the uptake.

A client manifest identifier is received by the server from a client. In some embodiments, the client manifest identifier is a string starting with the name of the client category (e.g., "web"). In various embodiments, the client manifest identifier comprises a numerical value, an integer value, a binary value, a hexadecimal value, a unique identifier, or any other appropriate identifier. The server utilizes the client manifest identifier to perform a lookup and obtain a client manifest corresponding to the client manifest identifier from a manifest store. In some embodiments, the client manifest identifier is received after a user associated with the client causes the client to send the client manifest identifier to the server (e.g., the user decides to load a page in the client), and the client manifest identifier sent may change when the user decides to update the client software running on the client device. In some embodiments, the client manifest identifier sent may change according to a schedule (e.g., weekly) to ensure that the client is utilizing the most recent version of the server software code that is compatible with the client. The client device provides a client manifest identifier instead of the client manifest itself to ensure a request does not get too large, the client manifest does not get corrupted during transmission, the manifest can be updated independent of either the server or client, and any concurrent manifest updates do not interrupt a user's in-progress transaction.

The server obtains the client manifest corresponding to the client manifest identifier from a manifest store. In various embodiments, the client manifest is in the form of a JSON file, a binary object file, or any other appropriate form. By storing client manifests in the manifest store, if an issue associated with the client device were discovered in a production environment, the issue could be fixed by updating the client manifest corresponding to the client manifest identifier to turn a feature off (e.g., by removing a capability or tag or indicating turning off using a feature flag) rather than wholly redeploying the client or server.

The client manifest holds a list of one or more capabilities associated with the client device. A feature may be tied to one or more capabilities. The server compares the one or more capabilities included in the client manifest to a plurality of available features and selects to include or exclude one or more features in a response based on the one or more capabilities included in the client manifest. For example, the server may determine to include feature A in the response because the client manifest indicates that the client device includes capability X, but exclude feature B in the response because the client manifest indicates that the client device excludes capability Y.

The manifest may also include one or more tags. A user interface (UI) widget is associated with a tag. A tag suggests how the data should be displayed by a device. A client manifest having a particular tag indicates that a client device associated with the client manifest is capable of properly rendering the widget associated with the tag.

The server provides to the client device a response that has a particular structure based on the one or more features. The response is in a particular structure of the server protocol tailored to the capabilities of the client device. The response includes one or more sets of instructions corresponding to the one or more features that the client device is capable of executing. This may prevent the client device from experiencing one or more errors when it sends a request to the server, because the client device is then known to be compatible with the one or more features that the server code returns in its response. The response may include data associated with a UI widget having a tag that was present in the client manifest, ensuring the data is properly displayed by the client device. Likewise, the server knows to not include data associated with a UI widget having a tag that was not present in the client manifest as it may cause the data to be improperly displayed by the client device.

In some embodiments, there is an error associated with a feature (e.g., a bug) that has been deployed to a client device. In some embodiments, the error is remedied by removing a capability corresponding to the feature from a client manifest corresponding to the client manifest identifier associated with a client device. As a result, the client device does not use the feature. In some embodiments, the error is remedied by rolling back the current version of a feature to a previously known working version of the feature. The current version of the feature may be rolled back to a previously known working version of the feature by updating the client manifest to include a capability corresponding to the previously known working version of the feature. The original capability can be left in place and continue to be used by new versions of the client which deploy a fix for this bug. The ability to selectively remove a feature or roll back a feature to a previously known working version of the feature enables the behavior of the software code running on the client device to be changed without having to roll back the entire server software code to a previously known working version of the server software code or to alter the client. This improves the computer allowing for the deployment of executable code to be more tailored for a client or client device, making the system more error proof as it can remove or roll back one or more features from deployed executable code, while keeping it simpler as the APIs can remain uniform and unchanged.

FIG. 1 is a block diagram illustrating an embodiment of a system for implementing a client manifest. In the example shown, client devices 102, 104, . . . , 106 are coupled to server 122. Although FIG. 1 depicts three client devices being coupled to server 122, server 122 may be coupled to n client devices. A client device may be a desktop, a laptop, a smartphone, a tablet, or any other computing device. Each of the client devices 102, 104, 106 is associated with a corresponding set of capabilities. For example, client device 102 may be capable of handling data having a records data type, but not data having a list data type. Client device 104 may be capable of handling data having a list data type, but not a records data type. Client device 106 may be capable of handling data having both a records data type and a list data type.

Client devices 102, 104, . . . , 106 are coupled to server 122 via connections 112, 114, . . . , 116, respectively. Connections 112, 114, . . . , 116 may be a wired or wireless connection. Connection 112, 114, . . . , 116 may be a local area network (LAN), a wide area network (WAN), a storage area network (SAN), a virtual private network (VPN), a metropolitan area network (MAN), intranet, the Internet, and/or a combination thereof.

Manifest store 126 is included in a non-volatile storage. In some embodiments, manifest store 126 is located in a storage of server 122. In some embodiments, manifest store 126 is located in storage remote from server 122. Manifest store 126 is configured to store a plurality of client manifests associated with a plurality of client devices, such as client devices 102, 104, . . . , 106. Each client manifest indicates the one or more capabilities associated with a client device. The client manifest may be associated with a plurality of client devices of the same type (e.g., client devices running iOSv8). Each client manifest may also include one or more tags. A UI widget is associated with a tag. A tag suggests how data associated with the UI widget is to be displayed by a device. A client manifest having a particular tag indicates that a client device associated with the client manifest is capable of properly displaying the data associated with the UI widget having the particular tag.

Server 122 is configured to receive a client manifest identifier from a client device, such as client devices 102, 104, . . . , 106. In some embodiments, the client manifest identifier is a string beginning with the type of the client (e.g., "web"). In response, client manifest analyzer 124 is configured to obtain a client manifest corresponding to the client manifest identifier from manifest store 126. Client manifest analyzer 124 is configured to utilize the obtained client manifest to determine one or more capabilities associated with the client device and/or one or more tags associated with the client device.

The client manifest includes a list of one or more capabilities associated with the client device. A feature (e.g., a set of instructions) may be tied to one or more capabilities. Client manifest analyzer 124 is configured to compare the one or more capabilities included in the client manifest to a plurality of available features and to indicate to include or exclude one or more features in a response. For example, the client manifest analyzer 124 may determine to include feature A in the response because the client manifest indicates that the client device includes capability X, but exclude feature B in the response because the client manifest indicates that the client device does not include capability Y.

The client manifest may also include one or more tags. A UI widget is associated with a tag. A tag indicates how data associated with the UI widget is to be displayed by a device. A client manifest having a particular tag indicates that a client device associated with the client manifest is capable of properly displaying the data inside the UI widget having the particular tag. Client manifest analyzer 124 may determine to include, in the response, data associated with a particular UI widget based on whether a tag corresponding to the particular UI widget is included in the client manifest. For example, client manifest analyzer 124 may determine to include data associated with a complex UI widget, instead of data associated with multiple smaller UI widgets, in the event the client manifest includes a tag associated with the complex UI widget.

Server 122 is configured to provide to the client device a response having a particular structure based on the one or more features. The response includes a set of features (e.g., a set of instructions) that the client device is capable of handling. The response is produced by a particular version of the server code tailored to the capabilities of the client device. The response includes one or more sets of instructions corresponding to the one or more features that the client device is capable of executing. This may prevent the client device from experiencing one or more errors when running the server code because the client device is compatible with the one or more features included in the server code. The response may include data associated with a UI widget having a tag that was included in the client manifest. This ensures the data is properly displayed by the client device. Including data associated with a UI widget having a tag that was not included in the client manifest may cause the data to be displayed in a different widget or a collection of different widgets by the client device.

Client developer 132 is coupled to manifest store 126 (e.g., as part of server 122) via connection 130. Connection 130 may be a wired or wireless connection. Connection 130 may be a LAN, a WAN, a SAN, a VPN, a MAN, intranet, the Internet, and/or a combination thereof. Client developer 132 is a developer who works on code for a certain client. Client developer 132 updates a client manifest associated with a client manifest identifier. Client developer 132 generates an initial version of a client manifest or can indicate how a client manifest is to be generated and stored by server 122. The server code associated with server 122 may be updated by server developer 142 to include one or more new features. Client developer 132 can update a stored client manifest or indicate how to update a stored client manifest (e.g., an initial version of the client manifest, an updated version of the client manifest, etc.) and to indicate a client device associated with a client manifest identifier corresponding to the stored client manifest that is compatible with a new feature. Client developer 132 may update the stored client manifest or indicate to update the stored client manifest at any time after the client device has been configured to support the new feature.

Server developer 142 is a developer who works on the server code. Server developer 142 is coupled to server 122 via connection 140. Connection 140 may be a wired or wireless connection. Connection 140 may be a LAN, a WAN, a SAN, a VPN, a MAN, intranet, the Internet, and/or a combination thereof.

In some embodiments, in response to there being an error associated with a feature (e.g., a bug) that has been deployed to a client device, the error is remedied by removing a capability corresponding to the feature from a client manifest corresponding to the client manifest identifier associated with the client device. As a result, the client device does not use the feature. In some embodiments, the server developer 142 is configured to remedy the error by rolling back the current version of a feature to a previously known working version of the feature. The current version of the feature may be rolled back to a previously known working version of the feature by updating the client manifest to include a capability corresponding to the previously known working version of the feature and removing the capability corresponding to the current version of the feature. The ability to selectively remove a feature or roll back a feature to a previously known working version of the feature enables the server software code running independently of the client device to be updated without having to roll back the entire server software code to a previously known working version of the server software code or to alter the client.

Figure 2:
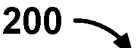
FIG. 2 is a flow diagram illustrating a process for implementing a client manifest in accordance with some embodiments.
Figure 2:
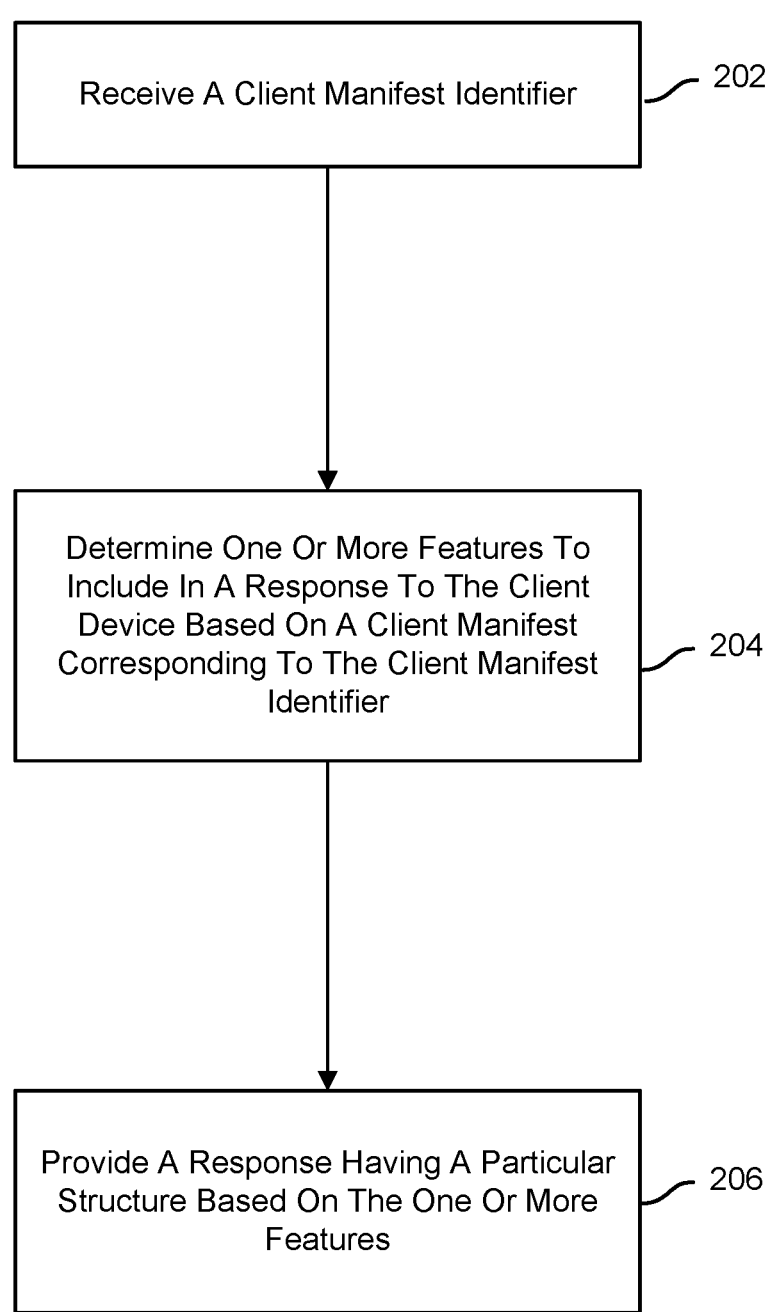

FIG. 2 is a flow diagram illustrating a process for implementing a client manifest in accordance with some embodiments. In the example shown, process 200 may be implemented by a server, such as server 122.

At 202, a client manifest identifier is received from a client device. In some embodiments, the client manifest identifier is a string. In some embodiments, the client manifest identifier is updated according to a schedule (e.g., weekly) to ensure that the client device is receiving responses from the most recent version of the server software code that is compatible with the client device. In some embodiments, the client manifest identifier is received after a user associated with the client device causes the client device to send the client manifest identifier to the server (e.g., the user decides to load a page in the client), and the client manifest identifier sent may change when the user decides to update the client software running on the client device.

At 204, one or more features to include in a response to the client device is determined based on the client manifest identifier. The server obtains the client manifest corresponding to the client manifest identifier (e.g., a JSON file, a binary object file, etc.) from a manifest store. The client manifest includes a list of one or more capabilities associated with the client device. The server determines one or more features corresponding to the one or more capabilities included in the client manifest.

The manifest may also include one or more tags. A UI widget is associated with a tag. A tag indicates how data associated with the UI widget is to be displayed by a client device. A client manifest having a particular tag indicates that a client device associated with the client manifest is capable of properly displaying the data associated with the UI widget having the particular tag.

At 206, a response having a particular structure is provided based on the one or more features. The response is a particular version of the server code tailored to the capabilities of the client device. The response includes one or more sets of instructions corresponding to the one or more features that the client device is capable of executing. This may prevent the client device from experiencing one or more errors when running the server code because the client device is compatible with the one or more features included in the server code.

The response may include data associated with a UI widget having a tag that was included in the client manifest. Having the tag in the client manifest ensures the data can be properly displayed by the client device. Including data associated with a UI widget having a tag that was not included in the client manifest may cause the data to be improperly displayed by the client device.

Figure 3:
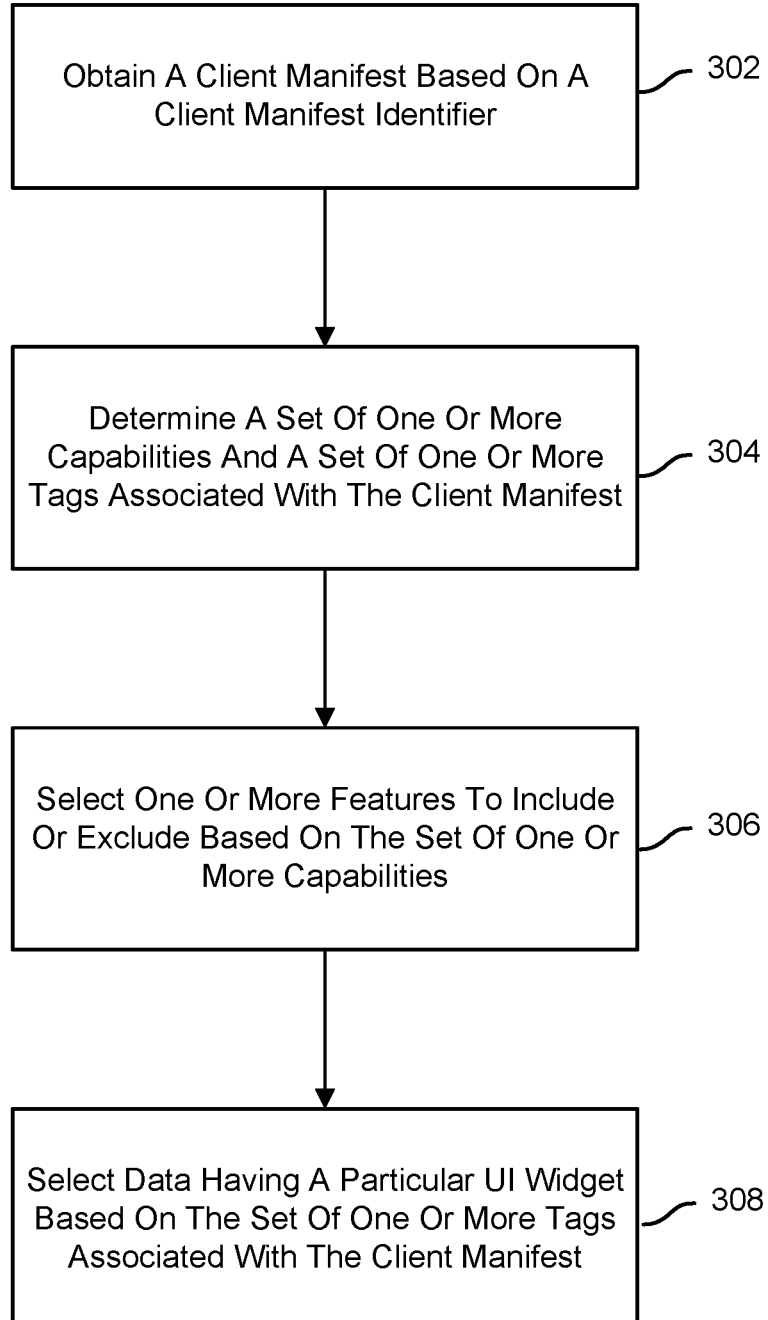
FIG. 3 is a flow diagram illustrating a process for determining one or more features to include in a response in accordance with some embodiments.

FIG. 3 is a flow diagram illustrating a process for determining one or more features to include in a response in accordance with some embodiments. In the example shown, process 300 may be implemented by a server, such as server 122. In some embodiments, process 300 is implemented to perform some of step 204 of process 200.

At 302, a client manifest is obtained based on a client manifest identifier. The client manifest is stored in a manifest store. In some embodiments, the manifest store is located in or associated locally with the server. In some embodiments, the manifest store is located remote from the server.

At 304, a set of tags and/or a set of capabilities for the client device are determined. The client manifest includes a list of one or more capabilities associated with the client device. The manifest may also include one or more tags. A UI widget is associated with a tag. A tag indicates how data associated with the UI widget is to be displayed by a device.

At 306, one or more features to include or exclude are selected based on the set of one or more capabilities associated with the client manifest. A feature may be tied to one or more capabilities. The server compares the one or more capabilities included in the client manifest to a plurality of available features and selects to include or exclude one or more features in a response. For example, the server may determine to include feature A in the response because the client manifest indicates that the client device includes capability X, but exclude feature B in the response because the client manifest indicates that the client device excludes capability Y.

At 308, data for a particular UI widget is selected based on the set of one or more tags associated with the client manifest. The server selects to include in the response data associated with a UI widget having a tag that was included in the client manifest. Having the tag in the client manifest ensures the data can be properly displayed by the client device. Including data associated with a UI widget having a tag that was not included in the client manifest may cause the data to be improperly displayed by the client device.

Figure 4:
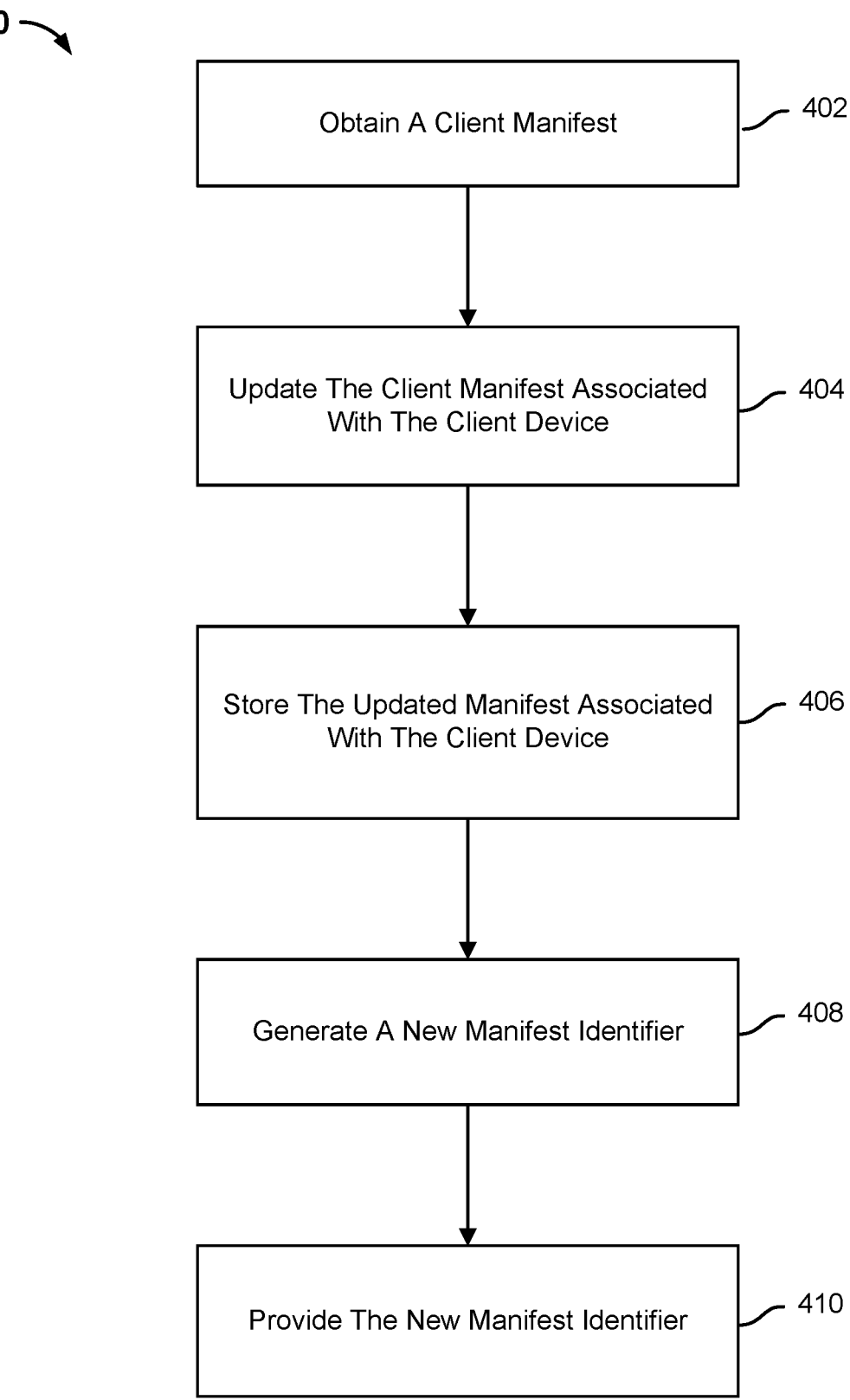
FIG. 4 is a flow diagram illustrating a process for adding an updated client manifest in accordance with some embodiments.

FIG. 4 is a flow diagram illustrating a process for adding an updated client manifest in accordance with some embodiments. In some embodiments, process 400 is implemented by a client developer, such as client developer 132. In some embodiments, process 400 is implemented by a server developer, such as server developer 142.

At 402, a client manifest stored in a manifest store is obtained.

At 404, the client manifest associated with the client device is updated. In some embodiments, a client developer updates the client manifest to include one or more capabilities. In some embodiments, a client developer updates the client manifest by removing one or more capabilities.

In some embodiments, a client developer updates the client manifest to include one or more tags. In some embodiments, a client developer updates the client manifest by removing one or more tags.

In some embodiments, a server developer removes from the client manifest a capability associated with an erroneous feature. In some embodiments, a server developer replaces a capability associated with an erroneous feature with a capability associated with a previously known working version of the feature.

At 406, the updated manifest associated with the client device is stored. The manifest store is configured to store multiple client manifests associated with multiple client manifest IDs. This enables the client device to revert the server software back to a previous version in the event an erroneous feature is released by the server, a feature was erroneously implemented by the client, or an incompatibility is discovered between client and server. In various embodiments, the updated manifest is stored as a new client manifest or a new version of the client manifest.

At 408, a new client manifest identifier is generated. For example, when a new client manifest or a new version of the client manifest is stored, a new client manifest identifier is generated and associated with the newly stored client manifest or newly stored version of the client manifest.

At 410, the new client manifest identifier is provided to a client device associated with the client manifest. In some embodiments, the client device utilizes the new client manifest identifier. In some embodiments, the client device utilizes a previous client manifest identifier in lieu of the new client manifest identifier. For example, a new feature associated with the new client manifest identifier may have one or more issues.

In some embodiments, steps 408 and 410 are optional, and the current client manifest identifier is retained as the client manifest identifier for the client device.

Figure 5:
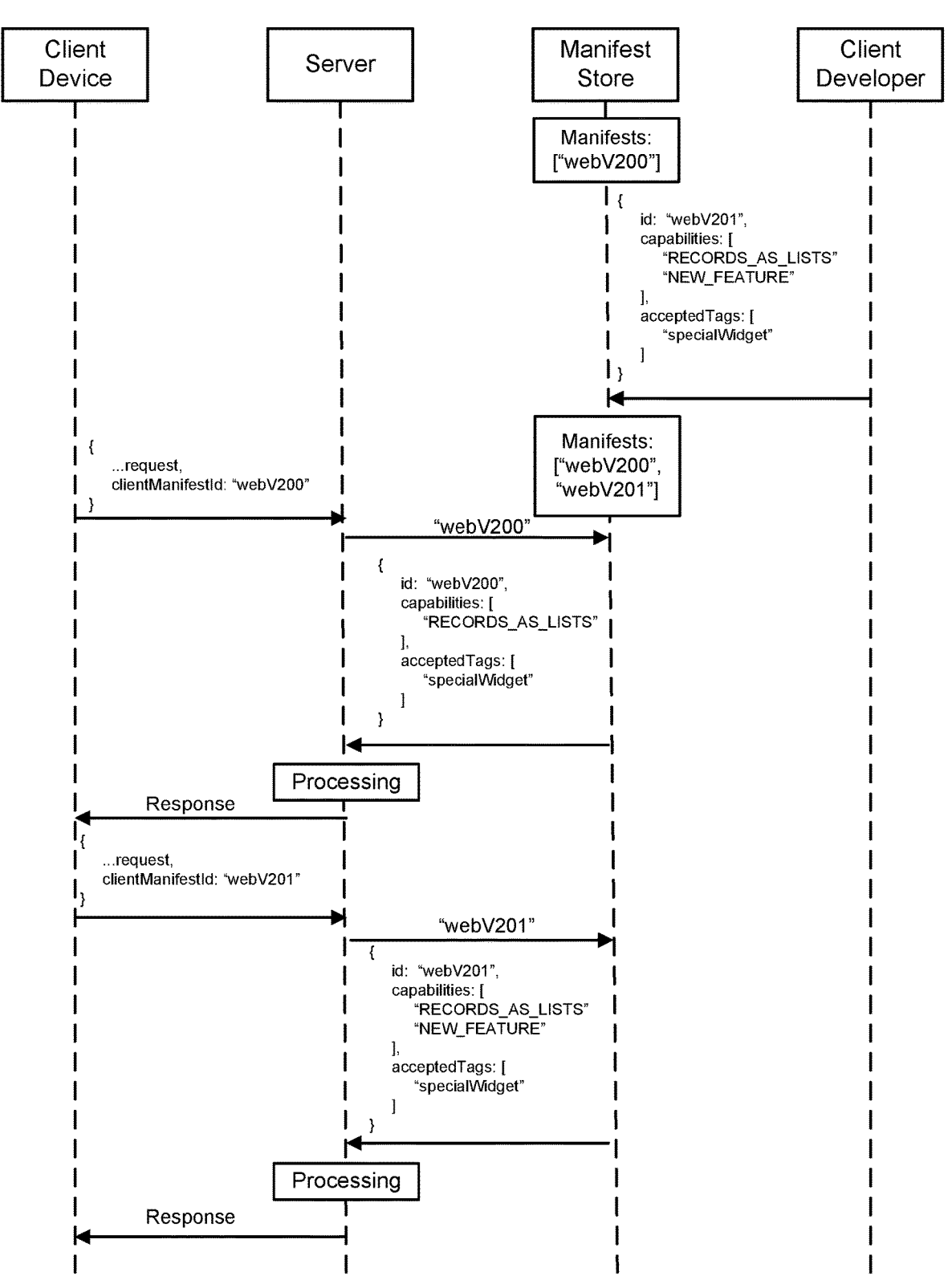
FIG. 5 is a diagram illustrating an example of a new client manifest being added.

FIG. 5 is a diagram illustrating an example of a new client manifest being added. In the example shown, a manifest store stores a client manifest named "webV200." A client developer updates the manifest store to include a new client manifest named "webV201." Client manifest "webV201" is an updated version of client manifest "webV200." The client manifest named "webV201" includes capabilities "RECORDS_AS_LISTS" and "NEW FEATURE" and a tag of "specialWidget." Both "webV200" and "webV201" exist in the store at the same time once the client developer publishes the latter.

A client device provides to the server a client manifest identifier of "webV200." The server obtains a client manifest corresponding to the client manifest identifier of "webV200." The client manifest named "webV200" includes a capability of "RECORDS_AS_LISTS" and a tag of "specialWidget." The server processes the client manifest and provides a response that includes the "RECORDS_AS_LISTS" feature and data associated with the "specialWidget" tag.

The client device provides to the server a client manifest identifier of "webV201." The server obtains a client manifest corresponding to the client manifest identifier of "webV201." The client manifest named "webV201" includes a capabilities of "RECORDS_AS_LISTS" and "NEW_FEATURE," and a tag of "specialWidget." The server processes the client manifest and provides a response that includes the "RECORDS_AS_LISTS" and "NEW FEATURE" features and data associated with the "special-Widget" tag.

Figure 6:
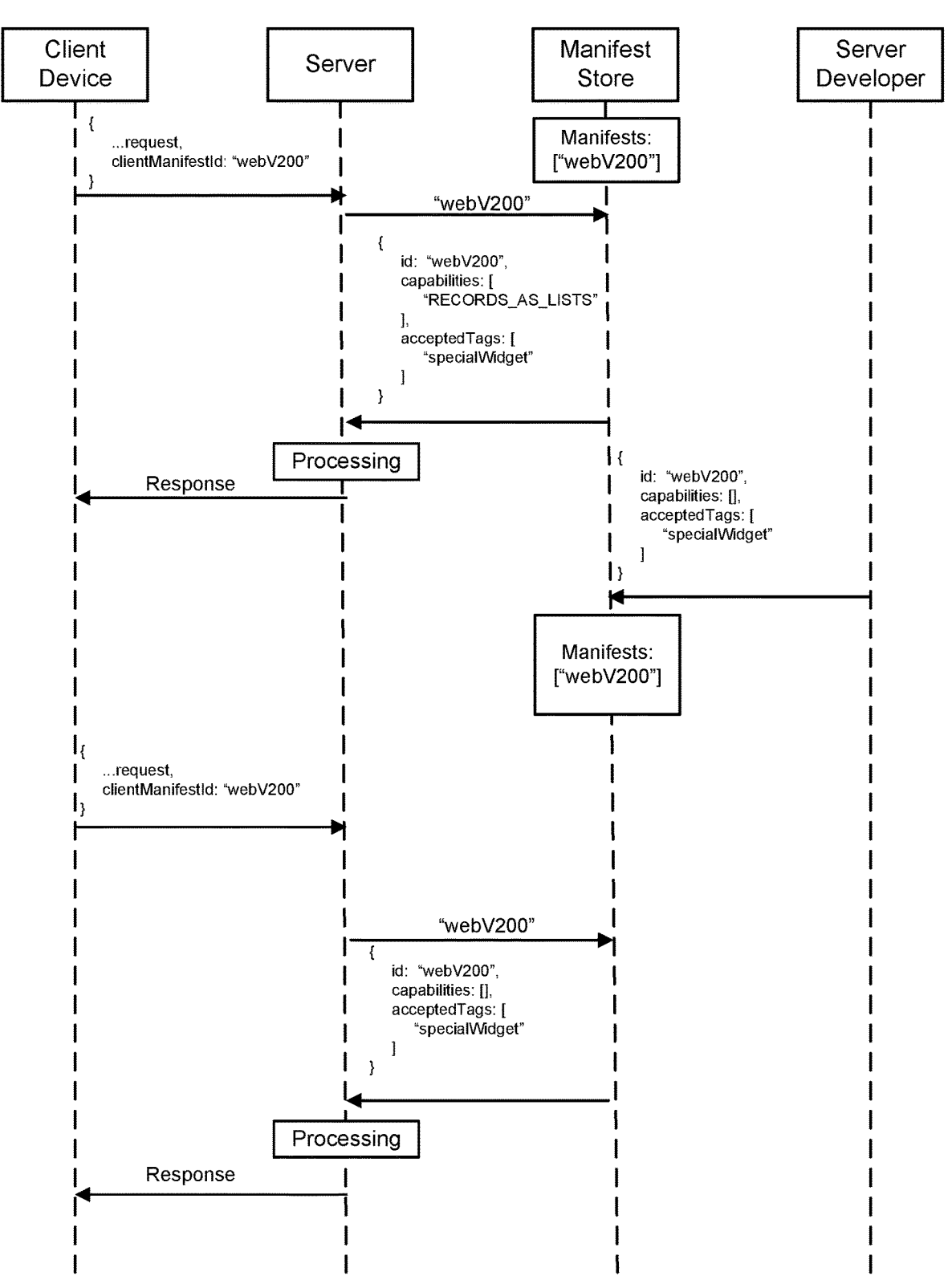
FIG. 6 is a diagram illustrating an example of a client manifest being updated.

FIG. 6 is a diagram illustrating an example of a client manifest being updated. In the example shown, a client device provides to the server a client manifest identifier of "webV200." The server obtains a client manifest corresponding to the client manifest identifier of "webV200." The client manifest named "webV200" includes a capability of "RECORDS_AS_LISTS" and a tag of "specialWidget." The server processes the client manifest and provides a response that includes the "RECORDS_AS_LISTS" feature and data associated with the "specialWidget" tag.

Afterwards, a server developer may determine that the code of the feature associated with the capability "RECORDS_AS_LISTS" causes the client device to experience one or more errors. The server developer may obtain the client manifest having the client manifest identifier of "webV200" from the manifest store, remove the "RECORDS_AS_LISTS" capability from the client manifest, and store the updated client manifest in the manifest store.

Later, the client device provides to the server a client manifest identifier of "webV200." The server obtains a client manifest corresponding to the client manifest identifier of "webV200." The client manifest named "webV200" does not include a capability of "RECORDS_AS_LISTS," but still includes a tag of "specialWidget." The server processes the client manifest and provides a response that excludes the "RECORDS_AS_LISTS" feature and includes data associated with the "specialWidget" tag.

Updating the client manifest in this manner enables the client issue to be avoided by turning off the feature without having to turn off all features associated with the client manifest, reverting back to a previous manifest, or updating the client software. The issue can be addressed by client developers at their earliest convenience without causing ongoing issues for users.

Figure 7:
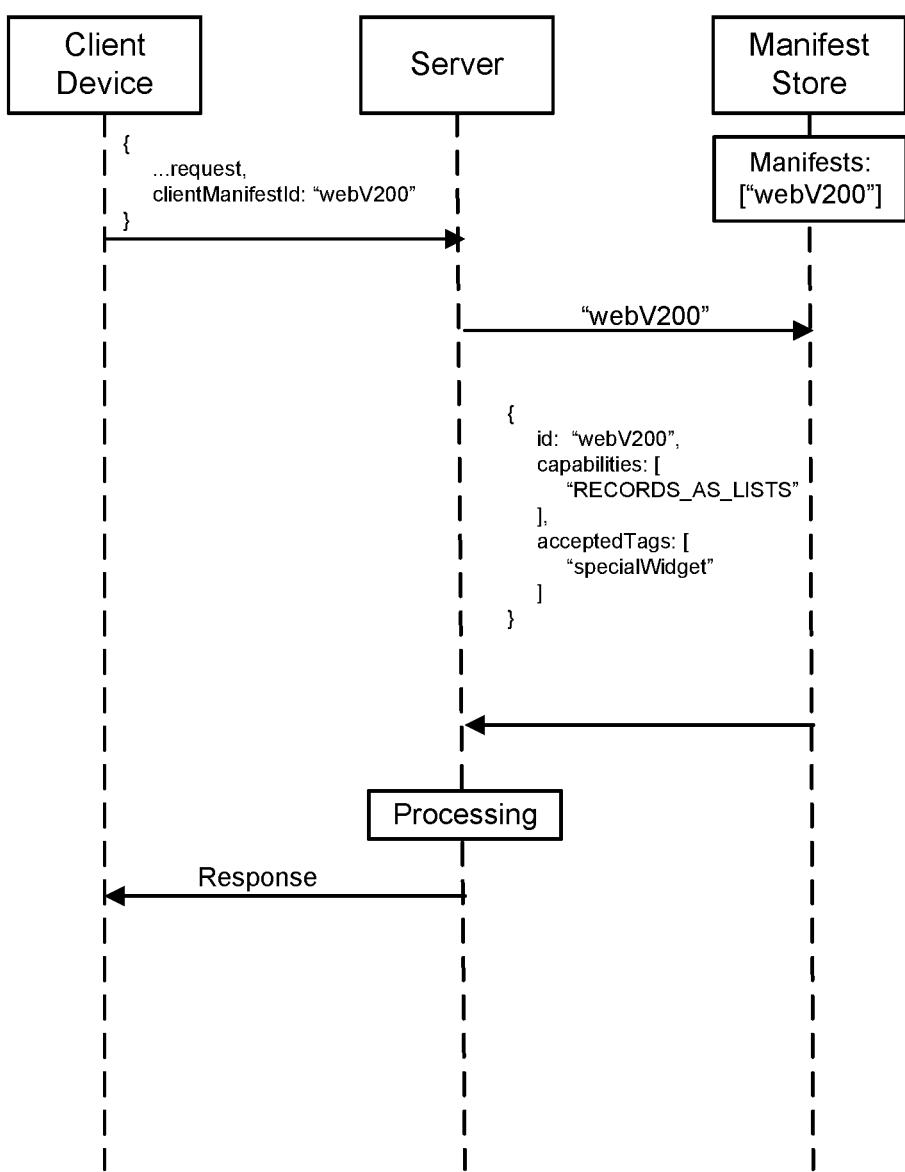
FIG. 7 is a diagram illustrating an example of a client manifest being utilized by a new web application client.

FIG. 7 is a diagram illustrating an example of a client manifest being utilized by a new web application client. In the example shown, a client device provides to the server a client manifest identifier of "webV200." The server obtains a client manifest corresponding to the client manifest identifier of "webV200." The client manifest named "webV200"

includes a capability of "RECORDS_AS_LISTS" and a tag of "specialWidget." The server processes the client manifest and provides a response that includes the "RECORD-S_AS_LISTS" feature and data associated with the "specialWidget" tag.

Figure 8:
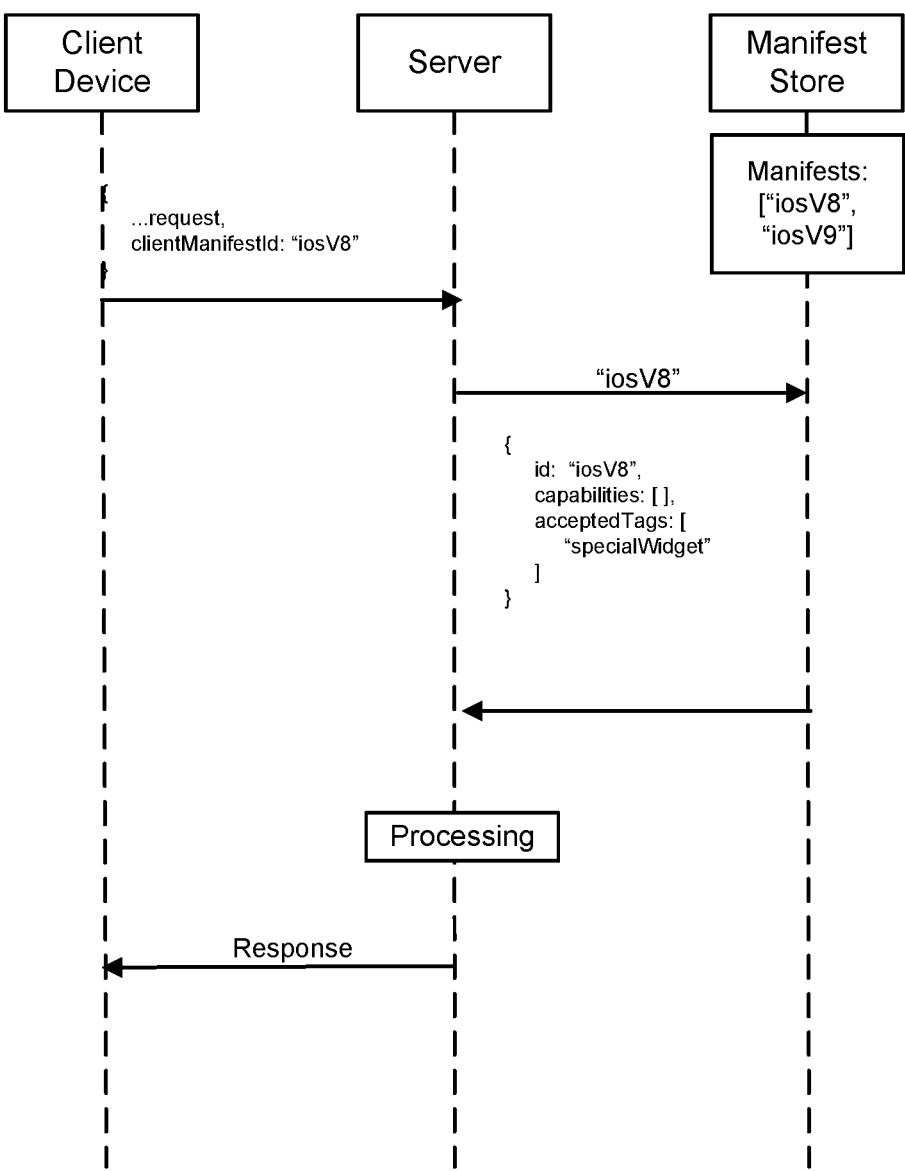
FIG. 8 is a diagram illustrating an example of a client manifest being utilized by an old iOS® application client.

FIG. 8 is a diagram illustrating an example of a client manifest being utilized by an old iOS® application client. In the example shown, a client device provides to the server a client manifest identifier of "iosV8." There are multiple manifests of different iOS application versions defined (e.g., "iosV8" and "iosV9"), but the system will return the one requested (e.g., iosV8). The server obtains a client manifest corresponding to the client manifest identifier of "iosV8." The client manifest named "iosV8" does not list any capabilities and includes a tag of "specialWidget." The server processes the client manifest and provides a response that includes data associated with the "specialWidget" tag, but does not include the "RECORDS_AS_LISTS" feature as provided to the web client in FIG. 6. The latest version of the client manifest for this category of device might be iosV30 but users who have not updated their application on their phones can continue to avoid bugs as the old manifest still exists.

Figure 9:
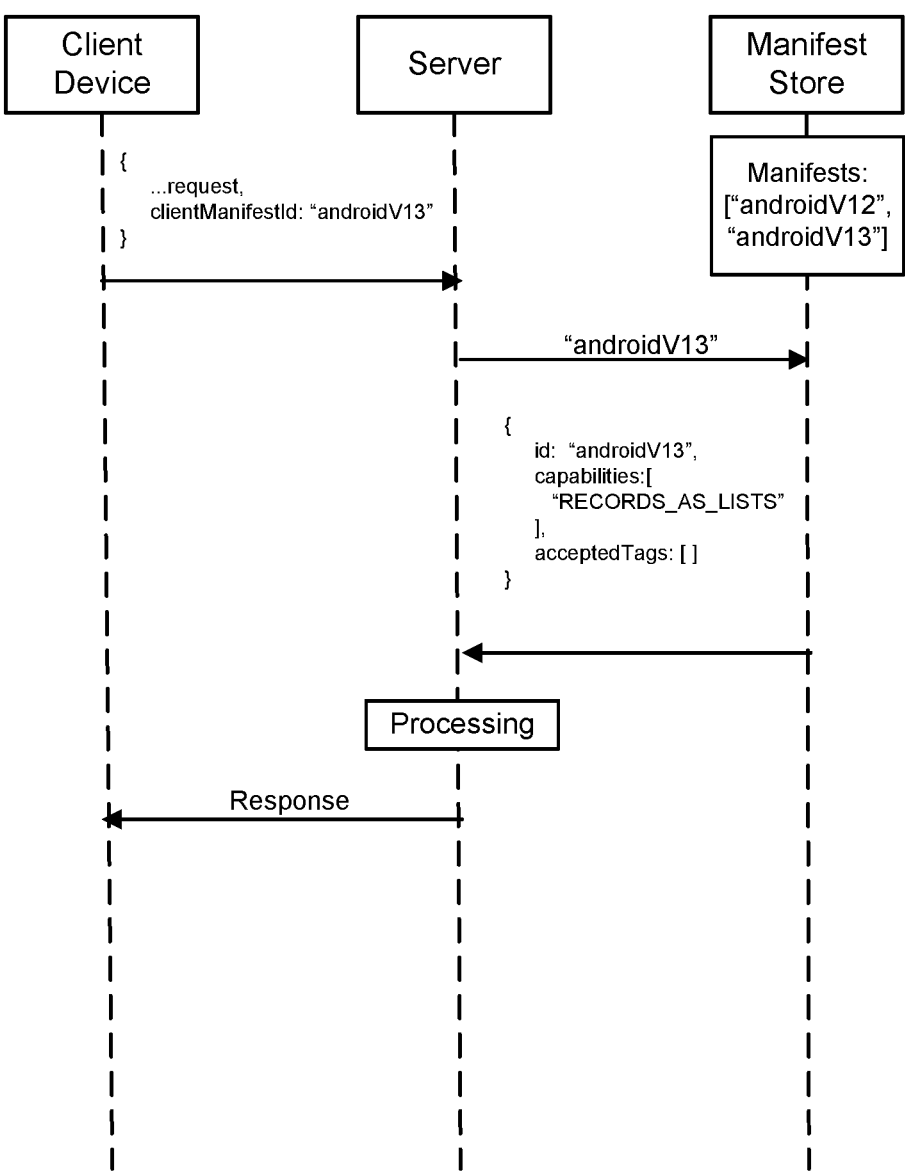
FIG. 9 is a diagram illustrating an example of a client manifest being utilized by a recent Android® application client.

FIG. 9 is a diagram illustrating an example of a client manifest being utilized by a recent Android® application client. In the example shown, a client device provides to the server a client manifest identifier of "androidV13". There are multiple manifests of different android application versions defined (e.g., "androidV12" and "androidV13"), but the system will return the one requested (e.g., androidV13). The server obtains a client manifest corresponding to the client manifest identifier of "android13." The client manifest named "androidV13" includes a capability of "RECORD-S_AS_LISTS," but does not include a tag of "specialWidget." The server processes the client manifest and provides a response that includes the "RECORDS_AS_LISTS" feature, but does not include data associated with the "special-Widget" tag. The latest version of the client manifest for this category of device might be androidV14 but users who have not updated their application on their phones can continue to avoid bugs as the previous manifest still exists.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving, by a server, a request from a client device, wherein the request comprises a client manifest identifier;
    determining, by the server, a client manifest corresponding to the client manifest identifier;
    obtaining, by the server, the client manifest from a manifest store, wherein the client manifest comprises (i) a list of one or more capabilities of the client device to run executable code and (ii) a first tag, wherein the list of the one or more capabilities of the client device comprises a first data type that the client device is capable of handling;
    selecting, by the server, to at least one of include or exclude one or more features in a response to the client device based on the one or more capabilities of the client device listed in the client manifest and the first tag, wherein the selecting comprises (i) selecting to include one or more first features associated with the first data type in the response and (ii) selecting to include first data associated with the first tag in the response;

providing, by the server, the response to the client device, wherein the response is different than the client manifest, wherein the response has a particular structure tailored to the client device based on the selected included or excluded one or more features; and after providing the response to the client device, updating the client manifest to an updated version of the client manifest in response to at least one of:

determining the response was erroneously executed by the client device, determining a feature was erroneously executed by the client device, or determining a capability of the one or more capabilities of the client device listed in the client manifest is associated with an erroneous feature that causes the client device to experience one or more errors.

2. The method of claim 1, wherein the client manifest identifier is a string.

3. The method of claim 1, wherein the client manifest identifier is a numerical value.

4. The method of claim 1, wherein the first data type that the client device is capable of handling comprises a new addition to a client/server data protocol.

5. The method of claim 1, wherein the first data selected to include in the response includes data associated with a user interface (UI) widget having the first tag.

6. The method of claim 1, further comprising receiving the updated version of the client manifest.

7. The method of claim 6, wherein the updated version of the client manifest includes one or more additional capabilities associated with the client device.

8. The method of claim 6, wherein the client manifest includes one or more tags associated with the client device, and wherein the updated version of the client manifest includes one or more additional tags associated with the client device.

9. The method of claim 6, wherein the updated version of the client manifest comprises an updated list that does not include at least one capability of the one or more capabilities of the client device listed in the client manifest.

10. The method of claim 6, wherein the client manifest includes one or more tags associated with the client device, and wherein the updated version of the client manifest does not include at least one tag of the one or more tags associated with the client device.

11. The method of claim 6, further comprising providing to the client device a new client manifest identifier corresponding to the updated version of the client manifest.

12. A system, comprising:

a processor configured to:

receive a request from a client device, wherein the request comprises a client manifest identifier;

determine a client manifest corresponding to the client manifest identifier;

obtain the client manifest from a manifest store, wherein the client manifest comprises a list of one or more capabilities of the client device to run executable code;

select to at least one of include or exclude one or more features in a response to the client device based on the one or more capabilities of the client device listed in the client manifest;

provide the response to the client device, wherein the response is different than the client manifest, wherein the response has a particular structure tailored to the client device based on the selected included or excluded one or more features; and after providing the response to the client device, update the client manifest to an updated version of the client manifest in response to at least one of:

determining the response was erroneously executed by the client device, determining a feature was erroneously executed by the client device, or determining a capability of the one or more capabilities of the client device listed in the client manifest is associated with an erroneous feature that causes the client device to experience one or more errors; and a memory coupled to the processor and configured to provide the processor with instructions.

13. The system of claim 12, wherein the client manifest identifier is a string.

14. A computer program product embodied in a non-transitory computer readable medium and comprising computer instructions for:

receiving, by a server, a request from a client device, wherein the request comprises a client manifest identifier;

determining, by the server, a client manifest corresponding to the client manifest identifier;

obtaining, by the server, the client manifest from a manifest store, wherein the client manifest comprises a list of one or more capabilities of the client device to run executable code;

selecting, by the server, to at least one of include or exclude one or more features in a response to the client device based on the one or more capabilities of the client device listed in the client manifest;

providing, by the server, the response to the client device, wherein the response is different than the client manifest, wherein the response has a particular structure tailored to the client device based on the selected included or excluded one or more features; and after providing the response to the client device, updating the client manifest to an updated version of the client manifest in response to at least one of:

determining the response was erroneously executed by the client device, determining a feature was erroneously executed by the client device, or determining a capability of the one or more capabilities of the client device listed in the client manifest is associated with an erroneous feature that causes the client device to experience one or more errors.

15. The method of claim 1, wherein selecting comprises comparing the one or more capabilities listed in the client manifest to a plurality of available features.

16. The method of claim 1, wherein a selected excluded feature of the one or more features is a current version the feature.

17. The method of claim 1, wherein a selected included feature of the one or more features is a previously known working version of the feature.

18. The method of claim 1, wherein the client manifest comprises at least one of a JSON file or a binary object file.

19. The system of claim 12, wherein the client manifest identifier is a numerical value.

20. The system of claim 12, wherein the response includes data associated with a user interface (UI) widget having a tag.

\* \* \* \* \*